(12) United States Patent
Nakano et al.

(10) Patent No.: US 10,240,553 B2
(45) Date of Patent: Mar. 26, 2019

(54) FUEL INJECTION SYSTEM FOR INTERNAL COMBUSTION ENGINE

(71) Applicant: TOYOTA JIDOSHA KABUSHIKI KAISHA, Toyota-shi (JP)

(72) Inventors: Tomohiro Nakano, Nagoya (JP); Eiji Murase, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 296 days.

(21) Appl. No.: 14/747,320

(22) Filed: Jun. 23, 2015

(65) Prior Publication Data
US 2015/0369161 A1    Dec. 24, 2015

(30) Foreign Application Priority Data
Jun. 24, 2014    (JP) .................. 2014-129290

(51) Int. Cl.
*F02D 41/30*    (2006.01)
*F02M 61/10*    (2006.01)
(Continued)

(52) U.S. Cl.
CPC ....... *F02D 41/3094* (2013.01); *F02D 41/402* (2013.01); *F02M 61/10* (2013.01);
(Continued)

(58) Field of Classification Search
CPC ............... F02D 41/3094; F02D 41/402; F02D 2041/398; F02D 2200/0602;
(Continued)

(56) References Cited

U.S. PATENT DOCUMENTS 6,032,642 A * 3/2000 Trumbower .......... F02D 41/068
                                                    123/299
6,748,920 B2 * 6/2004 Ito .......................... F02D 41/403
                                                    123/299
(Continued)

FOREIGN PATENT DOCUMENTS

JP    2013-104326    5/2013
JP    2013-199916    10/2013
(Continued)

*Primary Examiner* — David E Hamaoui
*Assistant Examiner* — Susan E Scharpf
(74) *Attorney, Agent, or Firm* — Oblon, McClelland, Maier & Neustadt, L.L.P.

(57) ABSTRACT

This fuel injection system includes a port injector, an in-cylinder injector, and a control device. The control device sets the number of executions of maximum partial lift injection per injection stroke based on the pressure of a fuel supplied to the in-cylinder injector and within a range of the number of injections in which an injection amount of the maximum partial lift injection per injection stroke becomes equal to or less than a target amount. This control device allows the in-cylinder injector to execute the number of executions of the maximum partial lift injection and allows the port injector to inject the fuel by the amount equal to the shortfall compared to the total injection amount only in the maximum partial lift injection by the in-cylinder injector.

6 Claims, 7 Drawing Sheets

(51) Int. Cl.
  *F02M 61/14* (2006.01)
  *F02D 41/40* (2006.01)
  *F02D 41/38* (2006.01)
(52) U.S. Cl.
  CPC ..... *F02M 61/145* (2013.01); *F02D 2041/389* (2013.01); *F02D 2200/0602* (2013.01); *F02D 2200/101* (2013.01); *Y02T 10/44* (2013.01)
(58) Field of Classification Search
  CPC .............. F02D 2200/101; F02M 61/10; F02M 61/145; Y02T 10/44
  USPC .......................................... 701/103; 123/480
  See application file for complete search history.

(56) References Cited

U.S. PATENT DOCUMENTS

| | | | | |
|---|---|---|---|---|
| 7,243,862 | B2* | 7/2007 | Dingle | F02B 23/0669 239/406 |
| 7,377,255 | B2* | 5/2008 | Miyashita | G01L 23/225 123/294 |
| 7,467,617 | B2* | 12/2008 | Irisawa | F02D 41/008 123/295 |
| 9,587,577 | B2* | 3/2017 | Nakano | F02P 5/1502 |
| 9,631,574 | B2* | 4/2017 | Nakano | F02D 41/3094 |
| 9,631,593 | B2* | 4/2017 | Nakajima | F02M 61/10 |
| 2001/0035164 | A1* | 11/2001 | Rahardja | F02M 21/0254 123/467 |
| 2006/0207565 | A1* | 9/2006 | Nishimura | F02D 41/022 123/431 |
| 2014/0244137 | A1* | 8/2014 | Nakano | F02D 41/3094 701/104 |
| 2014/0251281 | A1* | 9/2014 | Nakano | F02P 5/1502 123/478 |
| 2015/0369158 | A1* | 12/2015 | Nakajima | F02M 51/061 123/294 |

FOREIGN PATENT DOCUMENTS

| | | |
|---|---|---|
| JP | 2013-245576 | 12/2013 |
| JP | 2016-8542 A | 1/2016 |

* cited by examiner

FUEL INJECTION SYSTEM FOR INTERNAL COMBUSTION ENGINE

INCORPORATION BY REFERENCE

The disclosure of Japanese Patent Application No. 2014-129290 filed on Jun. 24, 2014 including the specification, drawings and abstract is incorporated herein by reference in its entirety.

BACKGROUND OF THE INVENTION

1. Field of the Invention

The invention relates to a fuel injection system for an internal combustion engine.

2. Description of Related Art

In order to improve exhaust properties, it is desirable to allow micro injection by decreasing the minimum injection amount per injection and realize a precise fuel injection control. However, as described in Japanese Patent Application Publication No. 2013-245576, an injection amount irregularity that is attributable to a bounce operation which is caused when a needle valve of an injector is fully open is likely to arise when the energizing time for the injector is shortened so as to decrease the injection amount per injection.

In contrast, the micro injection can be realized without causing the bounce operation when partial lift injection, during which the needle valve does not reach a fully-open state, is executed as described in Japanese Patent Application Publication No. 2013-104326.

SUMMARY OF THE INVENTION

However, the period during which the needle valve is open is short and the injection amount is small in the case of the partial lift injection during which the energization is terminated before the needle valve reaches the fully-open state. Accordingly, a deviation in the valve-open period and the valve-opening speed largely affect the injection amount and the injection amount is likely to become irregular.

The invention provides a fuel injection system for an internal combustion engine that is capable of realizing a precise fuel injection control using partial lift injection.

A fuel injection system for an internal combustion engine includes a port injector injecting a fuel into an intake port, an in-cylinder injector injecting a fuel into a cylinder, and a control device controlling each of the injectors by controlling the energization of each of the injectors.

According to an aspect of the invention, there is provided a fuel injection system for an internal combustion engine, the internal combustion engine including a port injector that injects fuel into an intake port; and an in-cylinder injector that injects fuel into a cylinder, the in-cylinder injector including a needle valve, and the in-cylinder injector being able to execute partial lift injection while the needle valve is not fully opened, the fuel injection system includes at least one electronic control unit configured to a) control the port injector and the in-cylinder injector by controlling energization of the port injector and the in-cylinder injector, b) set the number of times that maximum partial lift injection is executed in one fuel injection cycle, based on a pressure of the fuel supplied to the in-cylinder injector such that an injection amount of the maximum partial lift injection in one fuel injection cycle is equal to or less than a target injection amount for one injection cycle, the maximum partial lift injection being included in the partial lift injection, and the maximum partial lift injection being injection that requires the longest energization time of the in-cylinder injector, in the partial lift injection, c) cause the in-cylinder injector to execute the maximum partial lift injection the set number of times, and d) cause the port injector to inject the fuel in an amount equal to a shortfall with respect to the target injection amount.

In the partial lift injection, during which the energization is terminated before the needle valve reaches the fully-open state, an injection amount irregularity tends to increase as the energizing time decreases. Accordingly, the injection amount irregularity decreases, even during the partial lift injection, as the energizing time increases. Accordingly, a high-accuracy micro injection can be realized with the injection amount irregularity inhibited to the minimum when maximum partial lift injection, in which the energizing time is the longest in the partial lift injection, is executed.

Even in a case where the maximum partial lift injection is executed with the energizing time fixed, the injection amount increases or decreases when the pressure of the fuel supplied to the in-cylinder injector changes. Accordingly, it is desirable to appropriately set the number of executions of the maximum partial lift injection in accordance with the fuel pressure in a case where the maximum partial lift injection is executed more than once in a single injection stroke so that the fuel injection amount becomes equal to the target amount.

According to the configuration described above, the number of executions of the maximum partial lift injection per injection stroke is set in accordance with the pressure of the fuel supplied to the in-cylinder injector and the number of executions is set within a range of the number of injections in which the injection amount of the maximum partial lift injection becomes equal to or less than the target amount. Accordingly, the injection amount of the maximum partial lift injection per injection stroke is equal to or less than the target amount even when the pressure of the fuel supplied to the in-cylinder injector changes. The port injector is allowed to inject the fuel, by the amount equal to the shortfall compared to the total injection amount, only in the maximum partial lift injection by the in-cylinder injector, and thus an excessive increase in the injection amount attributable to a change in the pressure of the fuel supplied to the in-cylinder injector can be inhibited while the high-accuracy maximum partial lift injection is executed.

In other words, according to the configuration described above, the number of executions of the maximum partial lift injection is set in accordance with the fuel pressure and the injection of the fuel commensurate with the target amount can be performed, even during the partial lift injection, by using the high-accuracy maximum partial lift injection. Accordingly, the precise fuel injection control using the partial lift injection can be realized.

The electronic control unit may be configured to cause the port injector to inject fuel in the target injection amount when an amount of fuel injected through one execution of the maximum partial lift injection exceeds the target injection amount.

When the pressure of the fuel supplied to the in-cylinder injector is high, the number of injections at which the injection amount of the maximum partial lift injection in a single injection stroke becomes equal to or less than the target amount may be absent. In this case, the same amount of the fuel as the target amount can be supplied by injecting the same amount of the fuel as the target amount in entirety from the port injector as in the configuration described above.

The electronic control unit may be configured to set the number of times that the maximum partial lift injection is executed in one fuel injection cycle, to the largest number of times from among a plurality of numbers of times that satisfy a condition that the injection amount of the maximum partial lift injection in one fuel injection cycles is equal to or less than the target injection amount.

According to the configuration described above, the maximum partial lift injection can be executed to the maximum extent possible within a range in which the injection amount of the maximum partial lift injection does not exceed the target amount. Accordingly, the fuel injection control can be performed with the high-accuracy maximum partial lift injection utilized to the maximum extent possible even during the partial lift injection.

The electronic control unit may be configured to a) calculate a plurality of times that the maximum partial lift injection is executable in one fuel injection cycle based on an engine rotational speed, and b) set the number of times that the maximum partial lift injection is executed in one fuel injection cycle, to one of the calculated numbers of times.

The period suitable for the fuel injection is shortened as the engine rotation speed increases. Accordingly, the number of maximum partial lift injections that can be executed in a single injection stroke decreases. As a result, the set number of maximum partial lift injections may not be completely executed during the period suitable for the fuel injection when the engine rotation speed is high.

In contrast, according to the configuration described above, the number of executions of the maximum partial lift injection is set within a range of the number of the possible executions calculated based on the engine rotation speed. Accordingly, the incomplete execution of the set number of maximum partial lift injections during the period suitable for the fuel injection can be inhibited.

The electronic control unit may be configured to set the number of times that the maximum partial lift injection is executed in one fuel injection cycle, to the largest number of times from among the calculated numbers of times.

According to the configuration described above, the maximum partial lift injection can be executed to the maximum extent possible within a range of the number of the possible executions calculated based on the engine rotation speed with the injection amount of the maximum partial lift injection not exceeding the target amount. Accordingly, the fuel injection control can be performed with the high-accuracy maximum partial lift injection utilized to the maximum extent possible while the incomplete execution of the set number of maximum partial lift injections during the period suitable for the fuel injection can be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
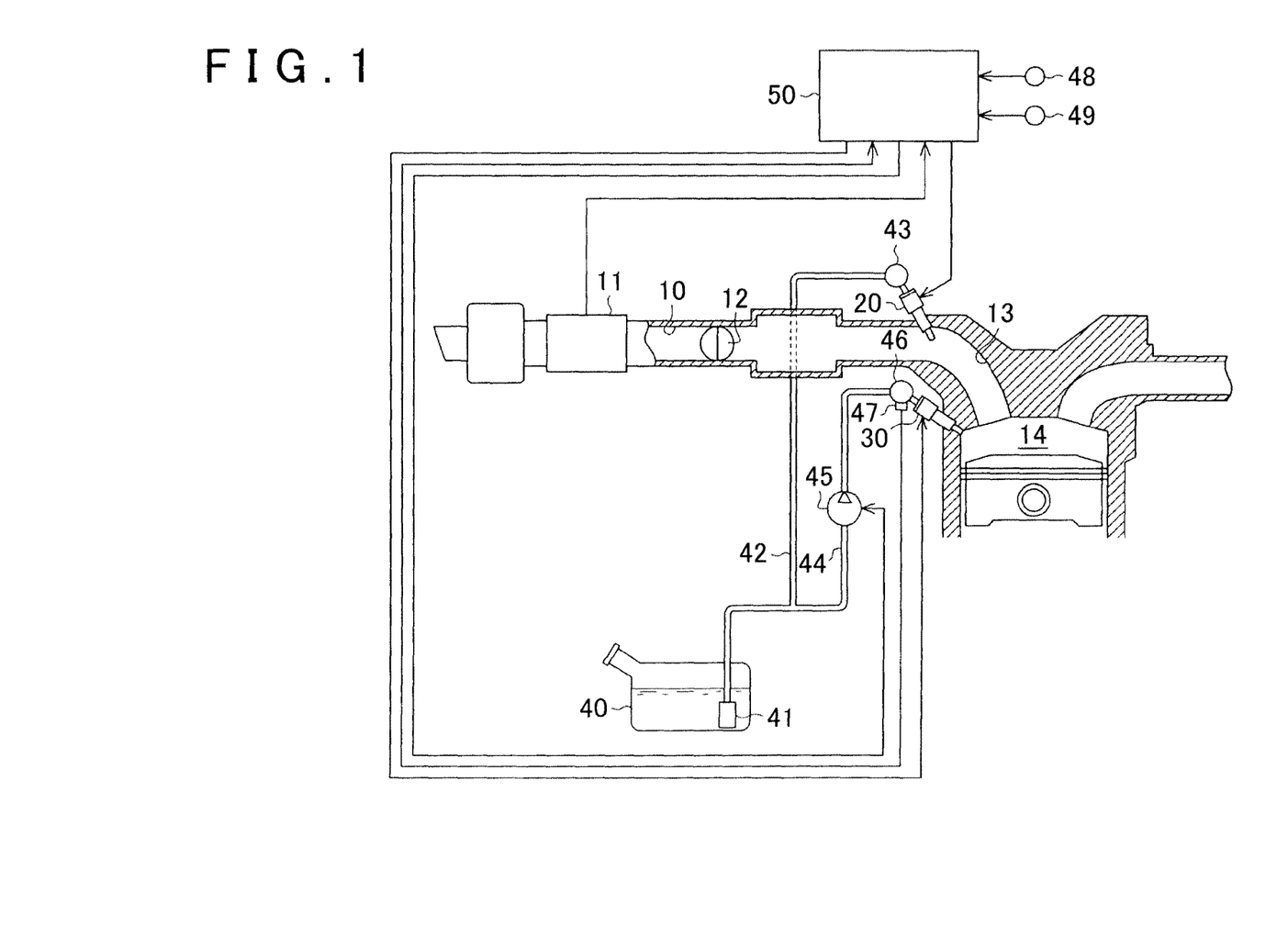
FIG. 1 is a schematic diagram illustrating the configuration of an embodiment of a fuel injection system for an internal combustion engine.

Hereinafter, an embodiment of a fuel injection system for an internal combustion engine will be described with reference to FIGS. 1 to 5. As illustrated in FIG. 1, an air flow meter 11 that detects an intake air amount and a throttle valve 12 that adjusts the intake air amount are arranged, in order from an upstream side, in an intake passage 10 of an internal combustion engine. The intake passage 10 branches on a further downstream side than the part where the throttle valve 12 is arranged and is connected to combustion chambers 14 for respective cylinders via intake ports 13.

Port injectors 20 for fuel injection into the intake ports 13 are arranged in the respective intake ports 13 for the respective cylinders. In-cylinder injectors 30 for fuel injection into the cylinders are arranged in the respective cylinders.

A feed pump 41 that pumps a fuel is arranged in a fuel tank 40 of the fuel injection system. The feed pump 41 is connected to a low-pressure fuel pipe 43, where the fuel pumped by the feed pump 41 is stored, via a low-pressure fuel passage 42. The port injectors 20 for the respective cylinders are connected to the low-pressure fuel pipe 43.

A high-pressure fuel passage 44 branches from the middle of the low-pressure fuel passage 42. A high-pressure fuel pump 45, which further pressurizes and discharges the fuel pumped by the feed pump 41, is arranged in the high-pressure fuel passage 44. The high-pressure fuel passage 44 is connected to a high-pressure fuel pipe 46 where the fuel pressurized by the high-pressure fuel pump 45 is stored. The in-cylinder injectors 30 for the respective cylinders are connected to the high-pressure fuel pipe 46.

A pressure sensor 47 is arranged in the high-pressure fuel pipe 46. The pressure sensor 47 detects the pressure of the fuel in the high-pressure fuel pipe 46, that is, a fuel pressure fp of the fuel supplied to the in-cylinder injectors 30.

A control device (electronic control unit) 50 is a control device that comprehensively controls the internal combustion engine and functions as a control device that controls the fuel injection system. The invention may be implemented by using a plurality of the control devices. Detection signals from sensors are input into the control device 50. The sensors include not only the air flow meter 11 and the pressure sensor 47 but also, for example, a crank position sensor 48 that outputs a crank angle signal for the calculation of an engine rotation speed, which is the rotation speed of a crankshaft, and a water temperature sensor 49 that detects the temperature of a coolant for the internal combustion engine. The control device 50 performs various types of control by driving the port injectors 20, the in-cylinder injectors 30, the high-pressure fuel pump 45, and the like based on the results of the detection by the sensors.

For example, the control device 50 performs fuel injection control and injection pressure control for in-cylinder injection. The injection pressure control for the in-cylinder injection is performed by feedback-adjusting the fuel discharge amount of the high-pressure fuel pump 45 based on the fuel pressure fp detected by the pressure sensor 47 so that the fuel pressure fp of the fuel supplied to the in-cylinder injectors 30 becomes equal to a target fuel pressure set based on the current engine operation state.

A total injection amount, which is a target injection amount, is calculated during the fuel injection control. Then, the control device 50 controls the energization of the port injectors 20 and the in-cylinder injectors 30 so that the amount of the injected fuel is equal to the total injection amount as the target amount.

Figure 2:
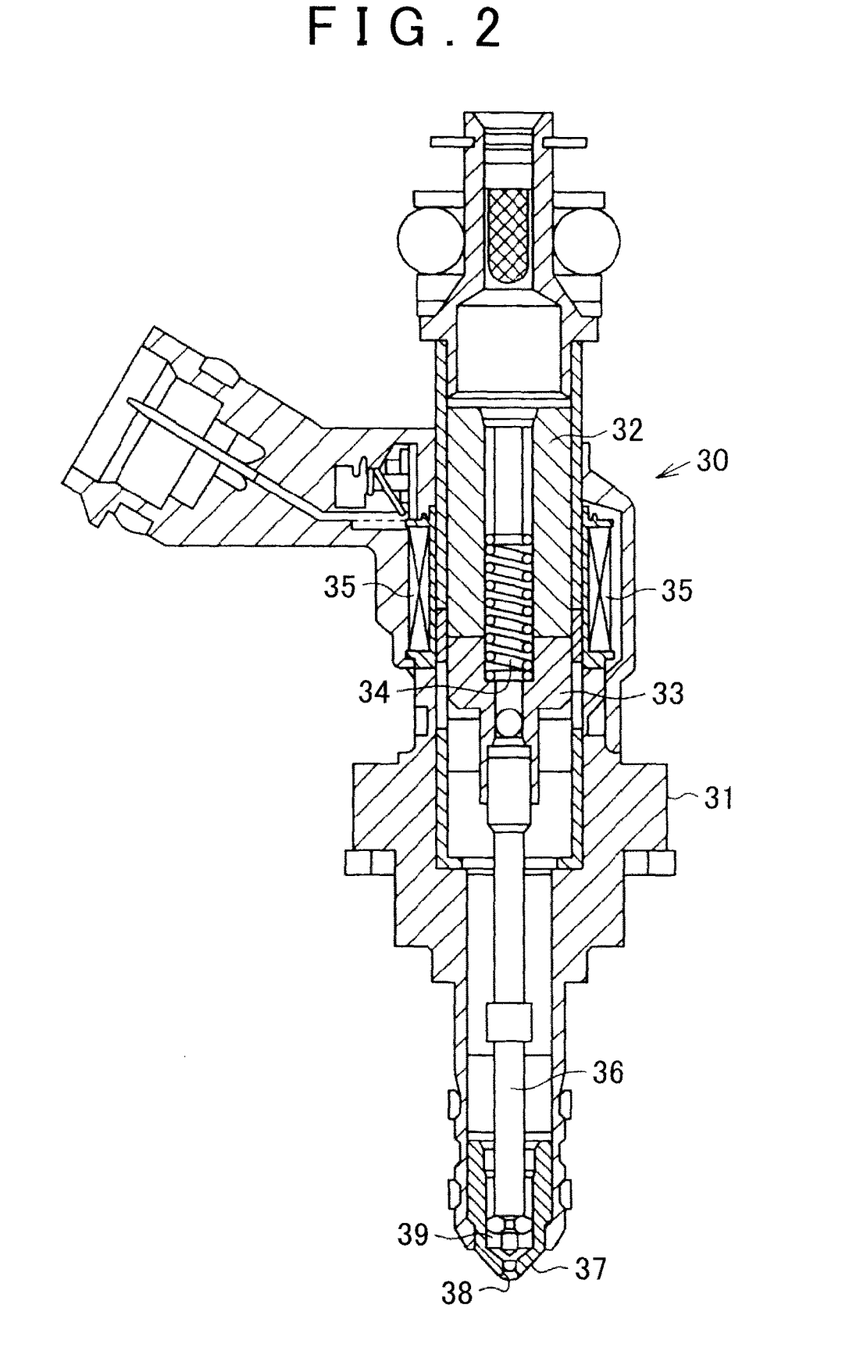
FIG. 2 is a sectional view of an in-cylinder injector of the fuel injection system according to this embodiment.

Next, the configuration of the in-cylinder injector 30 will be described in detail with reference to FIG. 2. As illustrated in FIG. 2, a fixed core 32 is fixed in a housing 31 of the in-cylinder injector 30. A movable core 33 is accommodated, to be slidable in the vertical direction of FIG. 2, at a position in the housing 31 that is adjacent to the fixed core 32. A needle valve 36 is connected to the movable core 33. The needle valve 36 is displaced in the vertical direction of FIG. 2 in response to a displacement of the movable core 33.

As illustrated in the lower section of FIG. 2, a nozzle body 37 that surrounds a tip portion of the needle valve 36 is attached to a tip portion of the housing 31. An elongated slit-shaped injection hole 38 is formed in a tip portion of the nozzle body 37.

As illustrated in the lower section of FIG. 2, a space 39 is formed between the needle valve 36 and the nozzle body 37. The space 39 communicates with the high-pressure fuel pipe 46. The high-pressure fuel in the high-pressure fuel pipe 46 is supplied into the space 39.

A spring 34 causes the movable core 33 to remain biased toward the lower section of FIG. 2, that is, in a direction away from the fixed core 32. A coil 35 is arranged at an outer circumferential part of the fixed core 32 in the housing 31. Accordingly, the energization of the coil 35 causes the fixed core 32 to be magnetized in the in-cylinder injector 30 and the movable core 33 to be pulled to the fixed core 32 against the biasing force of the spring 34. Then, the needle valve 36 is separated from the injection hole 38 to be opened and the fuel is injected through the injection hole 38. As illustrated in FIG. 2, the needle valve 36 is in a fully-open state when the movable core 33 abuts against the fixed core 32.

When the coil 35 is not energized, the movable core 33 is separated from the fixed core 32 due to the biasing force of the spring 34. As a result, the needle valve 36 abuts against the nozzle body 37 and is closed with the injection hole 38 blocked. In other words, the needle valve 36 is in a fully-closed state when the tip of the needle valve 36 abuts against the nozzle body 37 and the injection hole 38 is blocked. When the needle valve 36 blocks the injection hole 38 and is in the fully-closed state as described above, the injection of the fuel from the in-cylinder injector 30 is stopped.

Figure 3:
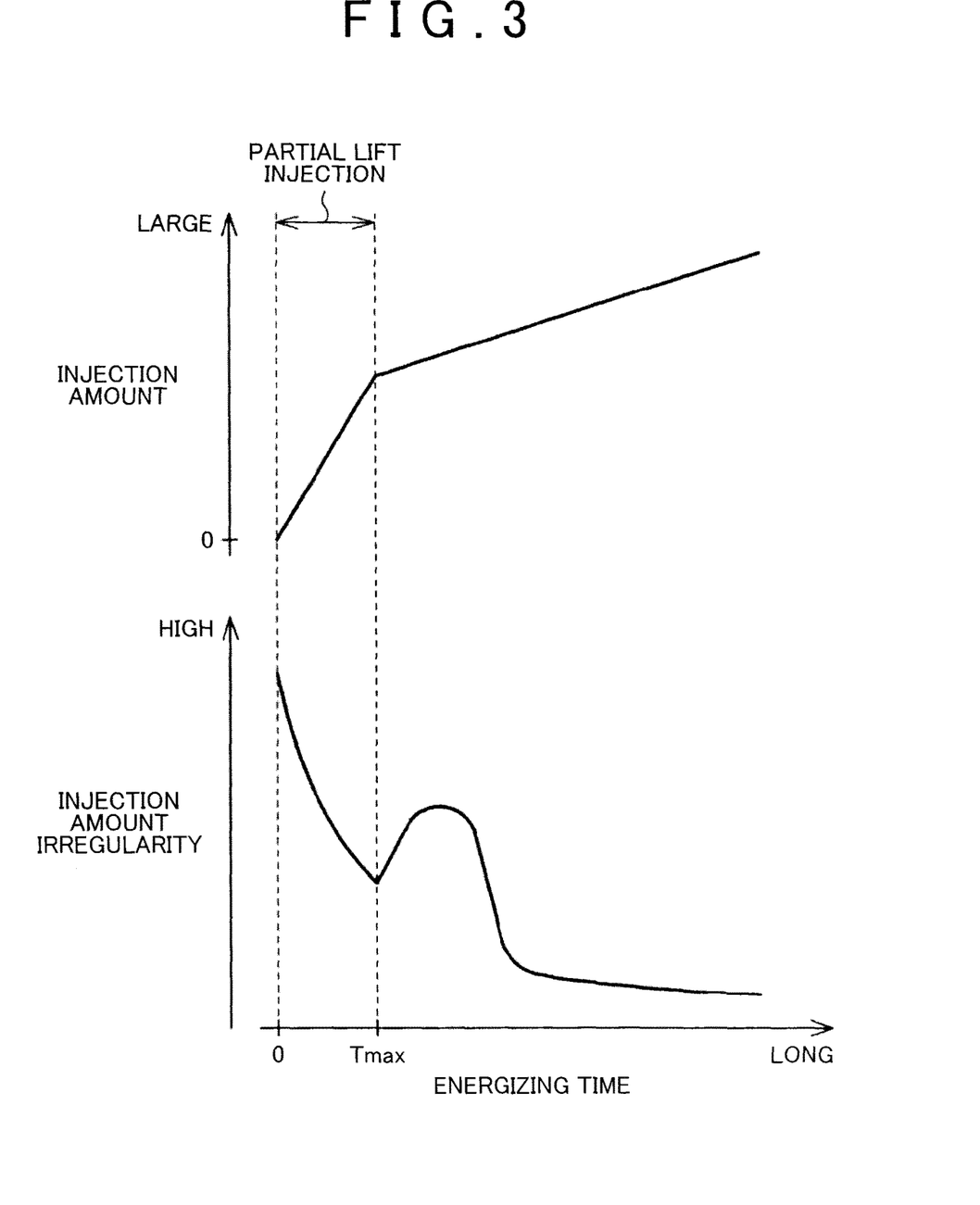
FIG. 3 is graphs illustrating relationships of energizing time for the in-cylinder injector according to this embodiment to an injection amount and an injection amount irregularity, the graphs illustrating a change in the injection amount with respect to a change in the energizing time and a change in the injection amount irregularity with respect to a change in the energizing time, respectively.

Regarding the in-cylinder injector 30, the injection amount increases as the length of the energizing time increases as illustrated in FIG. 3 and the rate of change in the injection amount with respect to a change in the energizing time is particularly high between the initiation of the energization and the moment when the needle valve 36 reaches the fully-open state (from the 0 to the Tmax in FIG. 3). This is because the lift amount of the needle valve 36 increases with the passage of the energizing time until the needle valve 36 is fully opened after the initiation of the energization. The rate of change in the injection amount with respect to the change in the energizing time becomes gradual once the energizing time exceeds the Tmax and the needle valve 36 is held in the fully-open state.

As illustrated in FIG. 3, the irregularity of the injection amount increases as the energizing time decreases and the injection amount decreases. In addition, the injection amount irregularity increases immediately after the energizing time reaches the Tmax. This is because the movable core 33 and the fixed core 32 abut against each other when the needle valve 36 is fully open, the collision between the movable core 33 and the fixed core 32 causes a bounce operation in the needle valve 36, and the bounce operation causes the lift amount of the needle valve 36 to pulsate.

In order to improve exhaust properties, it is desirable to allow micro injection by decreasing the minimum injection amount per injection and realize a precise fuel injection control. However, the injection amount irregularity that is attributable to the bounce operation which is caused when the needle valve 36 of the in-cylinder injector 30 is fully open is likely to arise when the energizing time for the in-cylinder injector 30 is shortened so as to decrease the injection amount per injection.

In contrast, the micro injection can be realized without causing the bounce operation when partial lift injection, during which the needle valve 36 does not reach the fully-open state, is executed. In the partial lift injection, during which the energization is terminated before the needle valve 36 reaches the fully-open state, the injection amount irregularity tends to increase as the energizing time decreases as illustrated in FIG. 3. Accordingly, the injection amount irregularity decreases, even during the partial lift injection, as the energizing time increases. Accordingly, the high-accuracy micro injection can be realized with the injection amount irregularity inhibited to the minimum when maximum partial lift injection, in which the energizing time is the longest in the partial lift injection, is executed. The maximum partial lift injection, in which the energizing time is the longest in the partial lift injection, is executed in this fuel injection system. The energizing time for the execution of the maximum partial lift is set based on the indexing of the energizing time for the least injection amount irregularity in the partial lift injection, which is based on the result of a previously-performed experiment or the like, and the indexed energizing time.

Even in a case where the maximum partial lift injection is executed with the energizing time fixed, the injection amount per injection from the in-cylinder injector 30 increases or decreases when the fuel pressure fp of the fuel supplied to the in-cylinder injector 30 changes. Accordingly, it is desirable to appropriately set the number of executions of the maximum partial lift injection in accordance with the fuel pressure fp in a case where the maximum partial lift injection is executed more than once in a single injection stroke so that the fuel injection amount becomes equal to the target amount.

In this fuel injection system, the number of executions of the maximum partial lift injection in a single injection stroke is set based on the fuel pressure fp of the fuel supplied to the in-cylinder injector 30.

Next, a series of processing relating to the setting of the number of executions of the maximum partial lift injection will be described with reference to FIG. 4. This series of processing is executed by the control device 50 as part of the fuel injection control. The control device 50 executes this series of processing following the calculation of the total injection amount as the target injection amount.

Figure 4:
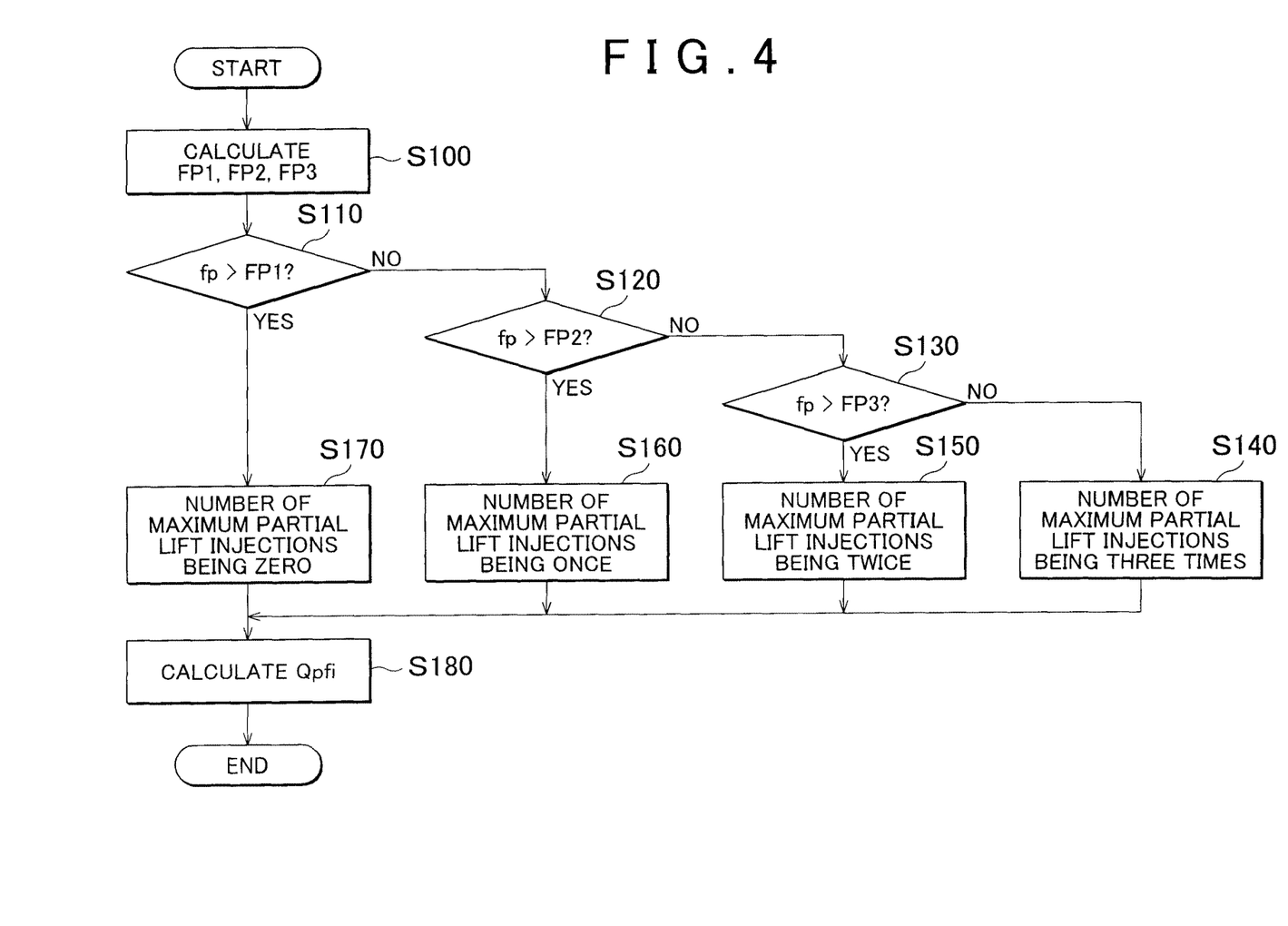
FIG. 4 is a flowchart illustrating the flow of a series of processing performed when the number of executions of maximum partial lift injection is set by a control device for the fuel injection system according to this embodiment.

When this processing is initiated, the control device 50 first calculates each of fuel pressures FP1, FP2, FP3 in Step S100 as illustrated in FIG. 4. The fuel pressures FP1, FP2, FP3 are required for the same amount of the fuel as the total injection amount, which is the target amount, to be injected by the maximum partial lift injection corresponding to each number of injections up to three. In other words, the fuel pressure FP1 that is required for the same amount of the fuel as the total injection amount to be injected by executing the maximum partial lift injection once, the fuel pressure FP2 that is required for the same amount of the fuel as the total injection amount to be injected by executing the maximum partial lift injection twice, and the fuel pressure FP3 that is required for the same amount of the fuel as the total injection amount to be injected by executing the maximum partial lift injection three times are calculated.

The amount of the fuel injected per maximum partial lift injection decreases as the fuel pressure fp of the fuel supplied to the in-cylinder injector 30 decreases. The amount of the fuel injected per maximum partial lift injection decreases as the number of executions of the maximum partial lift injection in a single injection stroke increases in a case where the same amount of the fuel as the total injection amount is injected through the maximum partial lift injection in a single injection stroke. Accordingly, the fuel pressure that is required for the same amount of the fuel as the total injection amount to be injected decreases as the number of executions of the maximum partial lift injection per injection stroke increases. Accordingly, the FP1 is the highest and the FP3 is the lowest among the FP1, FP2, FP3.

Next, the control device 50 determines in Step S110 whether or not the fuel pressure fp of the fuel supplied to the in-cylinder injector 30 exceeds the fuel pressure FP1 that is required for the same amount of the fuel as the total injection amount to be injected by executing the maximum partial lift injection once.

The processing proceeds to Step S120 in a case where it is determined in Step S110 that the fuel pressure fp of the fuel supplied to the in-cylinder injector 30 does not exceed the fuel pressure FP1 that is required for the same amount of the fuel as the total injection amount to be injected by executing the maximum partial lift injection once (Step S110: NO).

In Step S120, the control device 50 determines whether or not the fuel pressure fp of the fuel supplied to the in-cylinder injector 30 exceeds the fuel pressure FP2 that is required for the same amount of the fuel as the total injection amount to be injected by executing the maximum partial lift injection twice.

The processing proceeds to Step S130 in a case where it is determined in Step S120 that the fuel pressure fp of the fuel supplied to the in-cylinder injector 30 does not exceed the fuel pressure FP2 that is required for the same amount of the fuel as the total injection amount to be injected by executing the maximum partial lift injection twice (Step S120: NO).

In Step S130, the control device 50 determines whether or not the fuel pressure fp of the fuel supplied to the in-cylinder injector 30 exceeds the fuel pressure FP3 that is required for the same amount of the fuel as the total injection amount to be injected by executing the maximum partial lift injection three times.

The processing proceeds to Step S140 in a case where it is determined in Step S130 that the fuel pressure fp of the fuel supplied to the in-cylinder injector 30 does not exceed the fuel pressure FP3 that is required for the same amount of the fuel as the total injection amount to be injected by executing the maximum partial lift injection three times (Step S130: NO).

In Step S140, the control device 50 sets the number of executions of the maximum partial lift injection to three times. The processing proceeds to Step S150 in a case where it is determined in Step S130 that the fuel pressure fp of the fuel supplied to the in-cylinder injector 30 exceeds the fuel pressure FP3 that is required for the same amount of the fuel as the total injection amount to be injected by executing the maximum partial lift injection three times (Step S130: YES).

In Step S150, the control device 50 sets the number of executions of the maximum partial lift injection to twice. In other words, the control device 50 sets the number of executions of the maximum partial lift injection to twice in a case where the fuel pressure fp of the fuel supplied to the in-cylinder injector 30 exceeds the FP3 and does not exceed the FP2.

The processing proceeds to Step S160 in a case where it is determined in Step S120 that the fuel pressure fp of the fuel supplied to the in-cylinder injector 30 exceeds the fuel pressure FP2 that is required for the same amount of the fuel as the total injection amount to be injected by executing the maximum partial lift injection twice (Step S120: YES).

In Step S160, the control device 50 sets the number of executions of the maximum partial lift injection to once. In other words, the control device 50 sets the number of executions of the maximum partial lift injection to once in a case where the fuel pressure fp of the fuel supplied to the in-cylinder injector 30 exceeds the FP2 and does not exceed the FP1.

The processing proceeds to Step S170 in a case where it is determined in Step S110 that the fuel pressure fp of the fuel supplied to the in-cylinder injector 30 exceeds the fuel pressure FP1 that is required for the same amount of the fuel as the total injection amount to be injected by executing the maximum partial lift injection once (Step S110: YES).

In Step S170, the control device 50 sets the number of executions of the maximum partial lift injection to zero. The processing proceeds to Step S180 when the number of executions of the maximum partial lift injection is set as described above. In Step S180, the control device 50 calculates the injection amount Qpfi of the port injector 20.

The difference that is obtained by subtracting the injection amount Qdi of the maximum partial lift injection in a single injection stroke from the total injection amount is calculated as the injection amount Qpfi of the port injector 20. For example, the difference that is obtained by subtracting the sum of the injection amounts which is available when the maximum partial lift injection is executed twice from the total injection amount is calculated as the injection amount Qpfi of the port injector 20 in a case where the number of executions of the maximum partial lift injection is set to twice. In a case where the number of executions of the maximum partial lift injection is set to zero, the injection amount Qdi of the maximum partial lift injection is "zero". Accordingly, the value that is equal to the total injection amount is calculated as the injection amount Qpfi of the port injector 20.

This series of processing is temporarily terminated by the control device 50 when the injection amount Qpfi of the port injector 20 is calculated through Step S180 as described above. Then, the maximum partial lift injection by the in-cylinder injector 30 corresponding to the set number of executions and the fuel injection corresponding to the injection amount Qpfi of the port injector 20 are executed for the cylinder subjected to the injection stroke.

Figure 5:
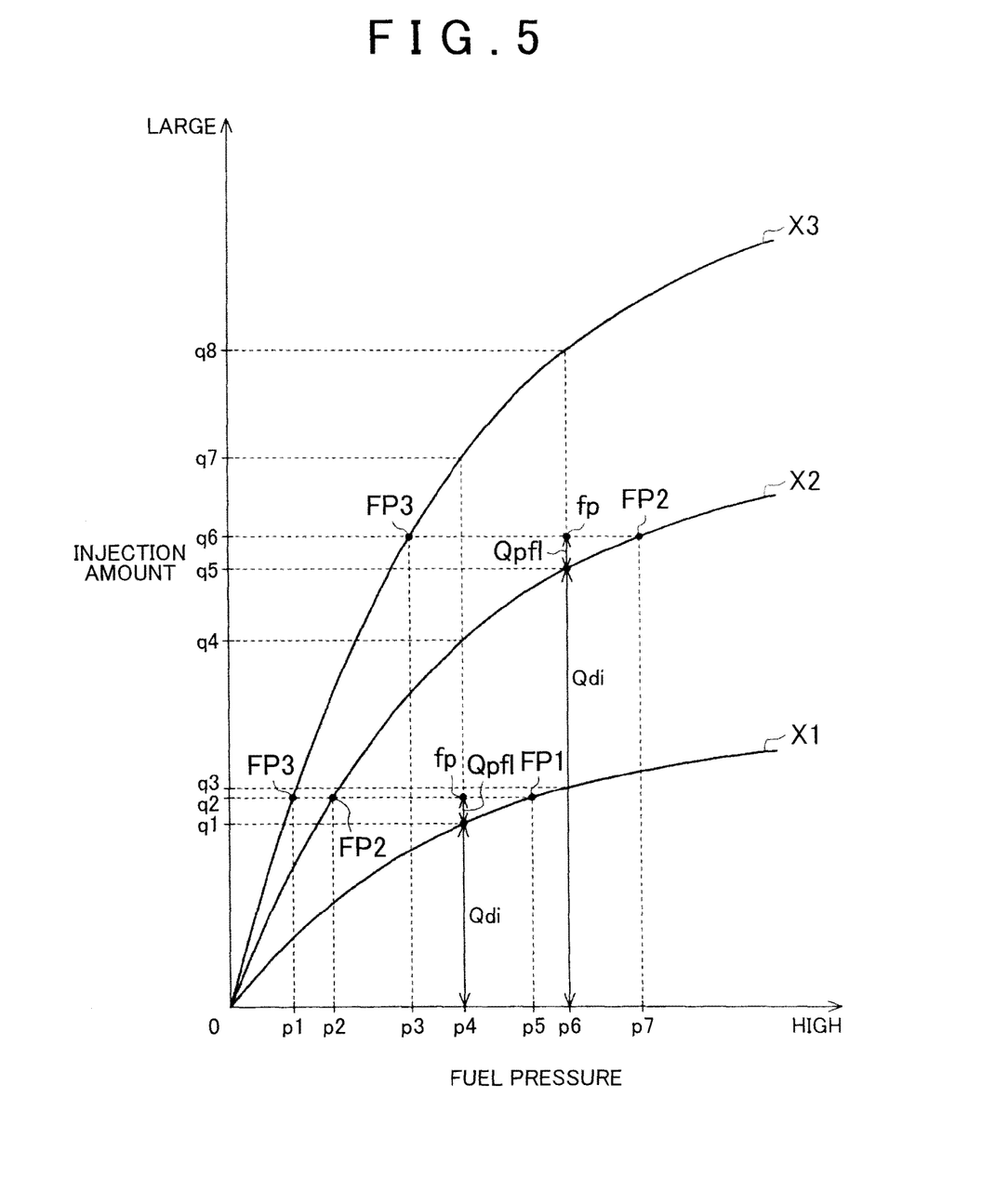
FIG. 5 is a graph illustrating changes in the injection amount with respect to a change in fuel pressure that are caused when the maximum partial lift injection is performed once, twice, and three times.

Next, an effect of the fuel injection system according to this embodiment will be described with reference to FIG. 5. The solid line X1 in FIG. 5 shows a change in the injection amount Qdi of the maximum partial lift injection with respect to a change in the fuel pressure fp pertaining to a case where the number of executions of the maximum partial lift injection is once. The solid line X2 in FIG. 5 shows a change in the injection amount Qdi of the maximum partial lift injection with respect to a change in the fuel pressure fp pertaining to a case where the number of executions of the maximum partial lift injection is twice. The solid line X3 in FIG. 5 shows a change in the injection amount Qdi of the maximum partial lift injection with respect to a change in the fuel pressure fp pertaining to a case where the number of executions of the maximum partial lift injection is three times. In FIG. 5, "q" represents the value of the injection amount and represents the value of the fuel pressure fp of the fuel supplied to the in-cylinder injector 30. The difference in the numbers that are attached to the "q" and the "p" shows that the respective values differ in magnitude from one another. The higher the attached number, the greater the value is.

As illustrated in FIG. 5, the fuel pressure FP1 that is required for the same amount of the fuel as "q2" to be injected by executing the maximum partial lift injection once is "p5" in a case where the total injection amount, which is the target injection amount, is "q2". The fuel pressure FP2 that is required for the same amount of the fuel as "q2" to be injected by executing the maximum partial lift injection twice is "p2" and the fuel pressure FP3 that is required for the same amount of the fuel as "q2" to be injected by executing the maximum partial lift injection is "p1".

In other words, the fuel pressure (FP1, FP2, FP3) at which the injection amount Qdi of the maximum partial lift injection and the total injection amount become equal to each other becomes equal to or higher than the fuel pressure fp of the fuel supplied to the in-cylinder injector 30 only when the injection is performed once among the numbers of injections of once to three times in a case where the fuel pressure fp of the fuel supplied to the in-cylinder injector 30 in this case is "p4".

In this case, the fuel pressure fp of the fuel supplied to the in-cylinder injector 30 exceeds the FP2 and does not exceed the FP1. Accordingly, a positive determination is made in Step S120 (Step S120: YES) in the series of processing described with reference to FIG. 4. Accordingly, in this case, the number of executions of the maximum partial lift injection is set to once through Step S160 in the series of processing described with reference to FIG. 4.

In other words, the number of executions of the maximum partial lift injection is set within a range of the number of injections of once to three times in which the fuel pressure (FP1, FP2, FP3) at which the injection amount Qdi of the maximum partial lift injection and the total injection amount become equal to each other becomes equal to or higher than the fuel pressure fp according to the configuration described above.

As illustrated by the solid line X1, the injection amount that is available when the maximum partial lift injection is executed once is "q1" in a case where the fuel pressure fp of the fuel supplied to the in-cylinder injector 30 is "p4". Accordingly, this "q1" becomes the injection amount Qdi of the maximum partial lift injection by the in-cylinder injector 30 in a single injection stroke.

The difference that is obtained by subtracting "q1" which is the injection amount Qdi of the maximum partial lift injection from "q2" as the total injection amount is calculated as the injection amount Qpfi of the port injector 20 through Step S180 in the series of processing described with reference to FIG. 4.

In this manner, the number of executions of the maximum partial lift injection is set to once in a case where the total injection amount is "q2" and the fuel pressure fp of the fuel supplied to the in-cylinder injector 30 is "p4". The fuel is injected from the port injector 20, by the amount equal to the shortfall compared to the total injection amount, only in the maximum partial lift injection by the in-cylinder injector 30.

As illustrated by the solid line X2, the injection amount Qdi of the maximum partial lift injection is "q4" in a case where the number of executions of the maximum partial lift injection is set to twice when the fuel pressure fp of the fuel supplied to the in-cylinder injector 30 is "p4". As illustrated by the solid line X3, the injection amount Qdi of the maximum partial lift injection is "q7" in a case where the number of executions of the maximum partial lift injection is set to three times when the fuel pressure fp of the fuel supplied to the in-cylinder injector 30 is "p4".

In other words, the injection amount Qdi of the maximum partial lift injection exceeds "q2" as the total injection amount in a case where the number of executions of the maximum partial lift injection is set to twice or three times when the fuel pressure fp of the fuel supplied to the in-cylinder injector 30 is "p4".

In contrast, the injection amount Qdi of the maximum partial lift injection in a single injection stroke becomes equal to or less than the total injection amount as the target amount when the number of executions of the maximum partial lift injection is set as described above in accordance with the fuel pressure fp of the fuel supplied to the in-cylinder injector 30. Then, the fuel is injected from the port injector 20, by the amount equal to the shortfall compared to the total injection amount, only in the maximum partial lift injection by the in-cylinder injector 30. Accordingly, an excessive increase in the injection amount can be inhibited.

Next, a case where the total injection amount is "q6" and the fuel pressure fp of the fuel supplied to the in-cylinder injector 30 is "p6" will be described. In this case, the fuel pressure FP2 that is required for the same amount of the fuel as "q6" to be injected by executing the maximum partial lift injection twice is "p7" as illustrated by the solid line X2. In addition, the fuel pressure FP3 that is required for the same amount of the fuel as "q6" to be injected by executing the maximum partial lift injection three times is "p3" as illustrated by the solid line X3.

In other words, the maximum number of injections among the numbers of injections allowing the fuel pressure (FP1, FP2, FP3) at which the injection amount Qdi of the maximum partial lift injection and the total injection amount become equal to each other to become equal to or higher than the fuel pressure fp of the fuel supplied to the in-cylinder injector 30 is twice in this case.

In this case, the fuel pressure fp of the fuel supplied to the in-cylinder injector 30 exceeds the FP3 and does not exceed the FP2. Accordingly, a positive determination is made in Step S130 (Step S130: YES) in the series of processing described with reference to FIG. 4. Accordingly, in this case, the number of executions of the maximum partial lift injection is set to twice through Step S150 in the series of processing described with reference to FIG. 4.

In other words, the maximum number of injections is set to the number of executions of the maximum partial lift injection within a range of the number of injections in which the fuel pressure (FP1, FP2, FP3) at which the injection amount Qdi of the maximum partial lift injection and the total injection amount become equal to each other becomes equal to or higher than the fuel pressure fp according to the configuration described above.

As illustrated by the solid line X2, the injection amount that is available when the maximum partial lift injection is executed twice is "q5" in a case where the fuel pressure fp of the fuel supplied to the in-cylinder injector 30 is "p6". Accordingly, this "q5" becomes the injection amount Qdi of the maximum partial lift injection by the in-cylinder injector 30 in a single injection stroke.

The difference that is obtained by subtracting "q5" which is the injection amount Qdi of the maximum partial lift injection from "q6" as the total injection amount is calculated as the injection amount Qpfi of the port injector 20 through Step S180 in the series of processing described with reference to FIG. 4.

In this manner, the number of executions of the maximum partial lift injection is set to twice in a case where the total injection amount is "q6" and the fuel pressure fp of the fuel supplied to the in-cylinder injector 30 is "p6". The fuel is injected from the port injector 20, by the amount equal to the shortfall compared to the total injection amount, only in the maximum partial lift injection by the in-cylinder injector 30.

As illustrated by the solid line X3, the injection amount Qdi of the maximum partial lift injection is "q8" in a case where the number of executions of the maximum partial lift injection is set to three times when the fuel pressure fp of the fuel supplied to the in-cylinder injector 30 is "p6".

In other words, the injection amount Qdi of the maximum partial lift injection exceeds "q6" as the total injection amount in a case where the number of executions of the maximum partial lift injection is set to three times when the fuel pressure fp of the fuel supplied to the in-cylinder injector 30 is "p6".

In contrast, the injection amount Qdi of the maximum partial lift injection in a single injection stroke becomes equal to or less than the total injection amount when the number of executions of the maximum partial lift injection is set as described above in accordance with the fuel pressure fp of the fuel supplied to the in-cylinder injector 30. Then, the fuel is injected from the port injector 20, by the amount equal to the shortfall compared to the total injection amount, only in the maximum partial lift injection by the in-cylinder injector 30. Accordingly, an excessive increase in the injection amount can be inhibited.

As illustrated by the solid line X1, the injection amount Qdi of the maximum partial lift injection is "q3" in a case where the number of executions of the maximum partial lift injection is set to once when the fuel pressure fp of the fuel supplied to the in-cylinder injector 30 is "p6". Accordingly, even in this case, an excessive increase in the injection amount can be inhibited since the injection amount Qdi of the maximum partial lift injection in a single injection stroke is exceeded by the total injection amount. In this case, however, the maximum partial lift injection is executed only once in a single injection stroke even though the maximum partial lift injection can be executed twice in a single injection stroke, and thus the high-accuracy maximum partial lift injection may not be utilized to the maximum extent possible.

In contrast, the maximum partial lift injection can be executed to the maximum extent possible within a range not exceeding the total injection amount when the number of executions of the maximum partial lift injection is set as described above. Accordingly, the fuel injection control can be performed with the high-accuracy maximum partial lift injection utilized to the maximum extent possible even during the partial lift injection.

When the fuel pressure fp of the fuel supplied to the in-cylinder injector 30 is high, the number of injections at which the fuel pressure at which the injection amount Qdi of the maximum partial lift injection in a single injection stroke and the total injection amount become equal to each other becomes equal to or higher than the fuel pressure fp of the fuel supplied to the in-cylinder injector 30 may be absent. In other words, the number of injections at which the injection amount Qdi of the maximum partial lift injection in a single injection stroke becomes equal to or less than the total injection amount may be absent.

For example, the injection amount Qdi of the maximum partial lift injection exceeds "q2" as the total injection amount as illustrated by the solid line X1, even if the number of executions of the maximum partial lift injection is set to once, in a case where the total injection amount is "q2" and the fuel pressure fp of the fuel supplied to the in-cylinder injector 30 exceeds "p5".

In this case, the fuel pressure fp of the fuel supplied to the in-cylinder injector 30 exceeds "p5" that is the fuel pressure FP1 which is required for the same amount of the fuel as the total injection amount to be injected by executing the maximum partial lift injection once. Accordingly, a positive determination is made in Step S110 (Step S110: YES) in the series of processing described with reference to FIG. 4. In this case, the number of executions of the maximum partial lift injection is set to zero through Step S170 in the series of processing described with reference to FIG. 4. In other words, no maximum partial lift injection is executed.

Since the value that is equal to the total injection amount is calculated as the injection amount Qpfi of the port injector 20 through Step S180, the same amount of the fuel as the total injection amount is injected in entirety from the port injector 20.

In other words, according to the configuration described above, the same amount of the fuel as the total injection amount is injected in entirety from the port injector 20 in a case where the number of injections at which the fuel pressure (FP1, FP2. FP3) at which the injection amount Qdi of the maximum partial lift injection and the total injection amount become equal to each other becomes equal to or higher than the fuel pressure fp of the fuel supplied to the in-cylinder injector 30 is absent. In short, the same amount of the fuel as the total injection amount is injected in entirety from the port injector 20 in a case where the number of injections at which the injection amount Qdi of the maximum partial lift injection is equal to or less than the total injection amount is absent.

The following effects are achieved by the embodiment described above. (1) The number of executions of the maximum partial lift injection per injection stroke is set in accordance with the fuel pressure fp of the fuel supplied to the in-cylinder injector 30 and the number of executions is set within a range of the number of injections in which the fuel pressure at which the injection amount Qdi of the maximum partial lift injection and the total injection amount become equal to each other becomes equal to or higher than the fuel pressure fp of the fuel supplied to the in-cylinder injector 30. Accordingly, the injection amount Qdi of the maximum partial lift injection per injection stroke does not exceed the total injection amount even when the fuel pressure fp of the fuel supplied to the in-cylinder injector 30 changes. The port injector 20 is allowed to inject the fuel, by the amount equal to the shortfall compared to the total injection amount, only in the maximum partial lift injection by the in-cylinder injector 30, and thus an excessive increase in the injection amount attributable to a change in the fuel pressure fp of the fuel supplied to the in-cylinder injector 30 can be inhibited while the high-accuracy maximum partial lift injection is executed.

In other words, according to the configuration described above, the number of executions of the maximum partial lift injection is set in accordance with the fuel pressure fp and the number of executions is set within a range of the number of injections in which the injection amount Qdi of the maximum partial lift injection per injection stroke becomes equal to or less than the total injection amount. Accordingly, the injection of the fuel commensurate with the target amount can be performed, even during the partial lift injection, by using the high-accuracy maximum partial lift injection. Accordingly, the precise fuel injection control using the partial lift injection can be realized.

(2) In a case where the fuel pressure fp of the fuel supplied to the in-cylinder injector 30 is high, the number of injections at which the injection amount Qdi of the maximum partial lift injection per injection stroke becomes equal to or less than the total injection amount may be absent. According to this configuration, however, the same amount of the fuel as the total injection amount is injected in entirety from the port injector 20 in this case, and thus the same amount of the fuel as the total injection amount can be supplied even in a case where the fuel pressure fp is high.

(3) The maximum number of injections among the numbers of injections at which the injection amount Qdi of the maximum partial lift injection per injection stroke becomes equal to or less than the total injection amount is set as the number of executions. Accordingly, the maximum partial lift injection can be executed to the maximum extent possible within a range not exceeding the total injection amount, and thus the fuel injection control can be performed with the high-accuracy maximum partial lift injection utilized to the maximum extent possible even during the partial lift injection.

The embodiment described above can be implemented in appropriately modified forms as follows. The fuel injection control using the maximum partial lift injection may be executed only in a case where a predetermined condition is satisfied. In this case, the processing for setting the number of executions of the maximum partial lift injection may be executed as in the embodiment described above in a case where the predetermined condition is satisfied.

A configuration in which the maximum number of injections among the numbers of injections at which the injection amount Qdi of the maximum partial lift injection per injection stroke becomes equal to or less than the target amount is set as the number of executions has been described as an example above. However, the maximum number of injections does not necessarily have to be equal to the number of executions.

For example, the number of executions may be set to once when the numbers of injections at which the injection amount Qdi of the maximum partial lift injection becomes equal to or less than the target amount are twice and once. The injection amount Qdi of the maximum partial lift injection per injection stroke becomes equal to or less than the total injection amount, which is the target amount, when the number of executions is set within a range of the number of injections in which the injection amount Qdi of the maximum partial lift injection becomes equal to or less than the target amount. Accordingly, an excessive increase in the injection amount can be inhibited and an effect similar to (1) of the embodiment described above can be achieved.

However, it is desirable to apply the configuration in which the maximum number of injections among the numbers of injections satisfying a condition is set as the number of executions as in the embodiment described above in maximizing the number of executions of the high-accuracy maximum partial lift injection, utilizing the high-accuracy maximum partial lift injection to the maximum extent possible, and realizing the precise fuel injection control.

The details of the processing relating to the setting of the number of executions may be appropriately changed insofar as the number of executions of the maximum partial lift injection per injection stroke can be set within a range of the number of injections in which the injection amount Qdi of the maximum partial lift injection becomes equal to or less than the target amount.

For example, the number of executions can also be set with reference to a two-dimensional map that uses the fuel pressure fp and the total injection amount as variables and reflects the relationship of a change in the injection amount Qdi by number of injections to the change in the fuel pressure fp illustrated by the solid lines X1, X2, X3 in FIG. 5.

For example, the two-dimensional map may be produced for once to be set as the number of executions for the region positioned between the solid line X1 and the solid line X2 in FIG. 5 and for twice to be set as the number of executions for the region positioned between the solid line X2 and the solid line X3 in FIG. 5 so that a result similar to that of the embodiment described above is achieved. An effect similar to that of the embodiment described above can be achieved when a configuration in which the number of executions is set with reference to the two-dimensional map is adopted.

A configuration in which the number of executions is set within a range of zero to three times has been described as an example of the embodiment described above. However, the option of the number of executions can be appropriately changed. For example, a configuration in which the number of injections is set as the number of executions commensurate with a condition among once, three times, and five times can also be adopted.

Figure 6:
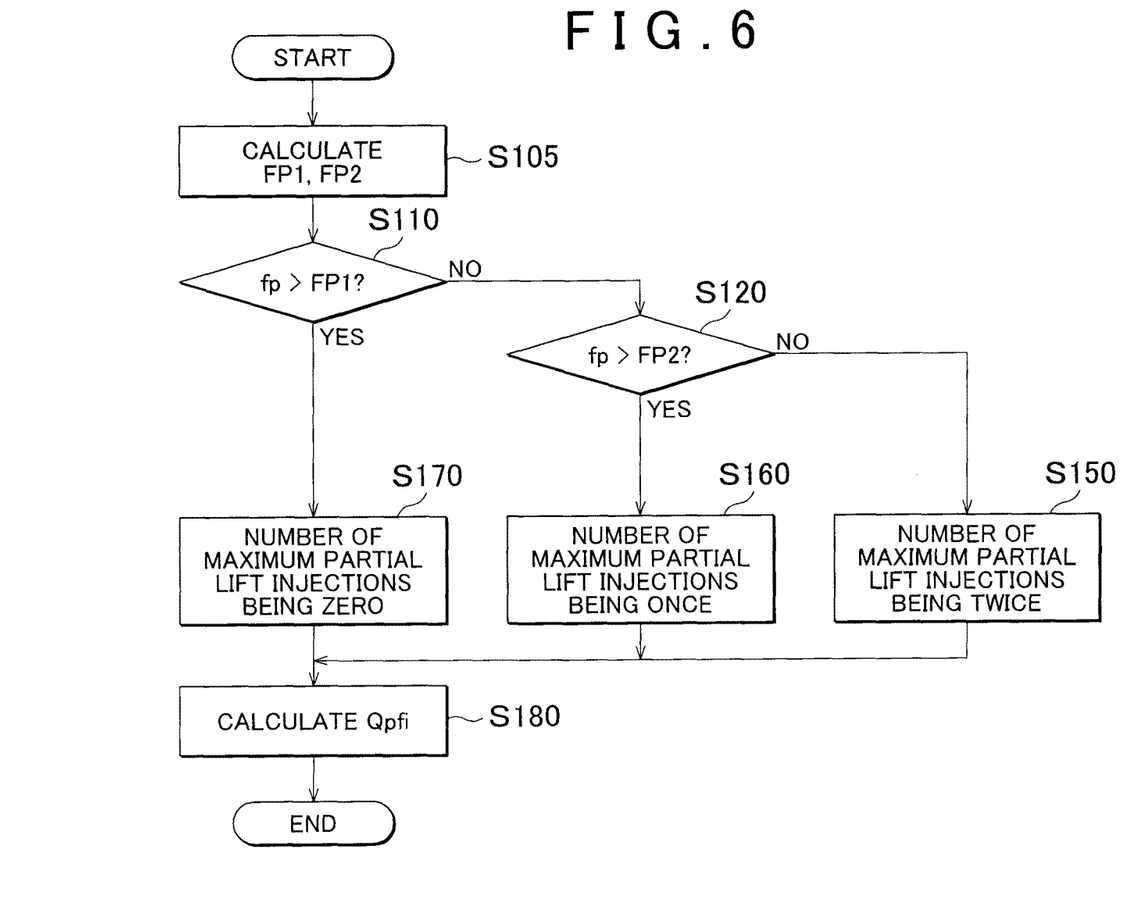
FIG. 6 is a flowchart illustrating a modification example of the series of processing performed when the number of executions of the maximum partial lift injection is set.

A technical idea similar to that of the embodiment described above can also be applied in a case where the number of injections exceeding three times can be selected and in a case where the number of executions is set within a range of zero to twice. In a case where the number of executions is set within a range of zero to twice, for example, the series of processing that is illustrated in FIG. 6 may be executed instead of the series of processing that has been described with reference to FIG. 4.

When this processing is initiated, the control device 50 first calculates the fuel pressure FP1 that is required for the same amount of the fuel as the total injection amount to be injected by executing the maximum partial lift injection once and the fuel pressure FP2 that is required for the same amount of the fuel as the total injection amount to be injected by executing the maximum partial lift injection twice. This calculation is performed in Step S105 as illustrated in FIG. 6.

Next, the control device 50 determines in Step S110 whether or not the fuel pressure fp of the fuel supplied to the in-cylinder injector 30 exceeds the fuel pressure FP1 that is required for the same amount of the fuel as the total injection amount to be injected by executing the maximum partial lift injection once.

The processing proceeds to Step S120 in a case where it is determined in Step S110 that the fuel pressure fp of the fuel supplied to the in-cylinder injector 30 does not exceed the fuel pressure FP1 that is required for the same amount of the fuel as the total injection amount to be injected by executing the maximum partial lift injection once (Step S110: NO).

In Step S120, the control device 50 determines whether or not the fuel pressure fp of the fuel supplied to the in-cylinder injector 30 exceeds the fuel pressure FP2 that is required for the same amount of the fuel as the total injection amount to be injected by executing the maximum partial lift injection twice.

The processing proceeds to Step S150 in a case where it is determined in Step S120 that the fuel pressure fp of the fuel supplied to the in-cylinder injector 30 does not exceed the fuel pressure FP2 that is required for the same amount of the fuel as the total injection amount to be injected by executing the maximum partial lift injection twice (Step S120: NO).

In Step S150, the control device 50 sets the number of executions of the maximum partial lift injection to twice. The processing proceeds to Step S160 in a case where it is determined in Step S120 that the fuel pressure fp of the fuel supplied to the in-cylinder injector 30 exceeds the fuel pressure FP2 that is required for the same amount of the fuel as the total injection amount to be injected by executing the maximum partial lift injection twice (Step S120: YES).

In Step S160, the control device 50 sets the number of executions of the maximum partial lift injection to once. The processing proceeds to Step S170 in a case where it is determined in Step S110 that the fuel pressure fp of the fuel supplied to the in-cylinder injector 30 exceeds the fuel pressure FP1 that is required for the same amount of the fuel as the total injection amount to be injected by executing the maximum partial lift injection once (Step S110: YES).

In Step S170, the control device 50 sets the number of executions of the maximum partial lift injection to zero. The processing proceeds to Step S180 when the number of executions of the maximum partial lift injection is set as described above. In Step S180, the control device 50 calculates the injection amount Qpfi of the port injector 20.

This series of processing is temporarily terminated by the control device 50 when the injection amount Qpfi of the port injector 20 is calculated through Step S180 as described above. Then, the maximum partial lift injection by the in-cylinder injector 30 corresponding to the set number of executions and the fuel injection corresponding to the injection amount Qpfi of the port injector 20 are executed for the cylinder subjected to the injection stroke.

When the configuration described above is adopted, the number of executions of the maximum partial lift injection can be set in accordance with the fuel pressure fp within a range of zero to twice and the fuel injection control using the high-accuracy maximum partial lift injection can be performed even during the partial lift injection.

The periods that are suitable for the fuel injection for the respective cylinders are shortened as the engine rotation speed increases. Accordingly, the number of maximum partial lift injections that can be executed in a single injection stroke decreases. As a result, the set number of maximum partial lift injections may not be completely executed during the period suitable for the fuel injection when the engine rotation speed is high.

It is desirable to calculate the number of maximum partial lift injections by the in-cylinder injector 30 that can be executed during a single injection stroke based on the engine rotation speed and set the number of executions within a range of the calculated number of the possible executions in inhibiting the incomplete execution of the set number of maximum partial lift injections during the period suitable for the fuel injection.

Figure 7:
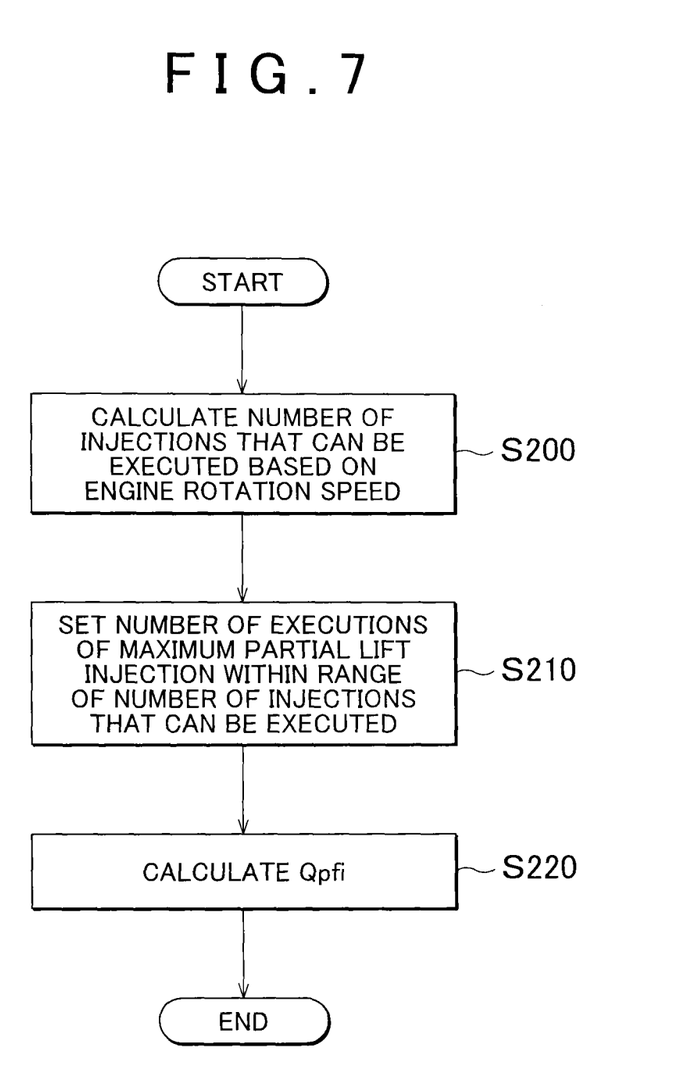
FIG. 7 is a flowchart illustrating another modification example of the series of processing performed when the number of executions of the maximum partial lift injection is set.

The configuration described above can be realized when, for example, the number of executions of the maximum partial lift injection is set by executing the series of processing that is illustrated in FIG. 7. When this series of processing is initiated, the control device 50 first calculates, in Step S200, the number of maximum partial lift injections that can be executed during the period suitable for the fuel injection based on the engine rotation speed. Specifically, the length of the period suitable for the fuel injection is calculated based on the engine rotation speed and the number of maximum partial lift injections that can be executed during the calculated period is calculated based on the length of the energizing time for a single maximum partial lift injection and the length of the interval which is required between the respective maximum partial lift injections. Then, the processing proceeds to Step S210 after the number of the injections that can be executed is calculated through Step S200.

In Step S210, the control device 50 sets the number of executions of the maximum partial lift injection within a range of the number of injections that can be executed. Herein, the control device 50 sets the number of injections within a range of the number of injections in which the injection amount Qdi of the maximum partial lift injection per injection stroke becomes equal to or less than the total injection amount and within a range of the number of injections that can be executed as the number of executions. The processing proceeds to Step S220 after the number of executions is set through Step S210.

In Step S220, the control device 50 calculates the injection amount Qpfi of the port injector 20 as in the embodiment described above. In other words, the difference that is obtained by subtracting the injection amount Qdi of the maximum partial lift injection per injection stroke from the total injection amount is calculated as the injection amount Qpfi of the port injector 20.

This series of processing is temporarily terminated by the control device 50 after the injection amount Qpfi of the port injector 20 is calculated through Step S220 as described above. Then, the maximum partial lift injection by the in-cylinder injector 30 corresponding to the set number of executions and the fuel injection corresponding to the injection amount Qpfi of the port injector 20 are executed for the cylinder subjected to the injection stroke.

When the configuration described above is adopted, the number of executions of the maximum partial lift injection is set within a range of the number of the possible executions calculated based on the engine rotation speed. Accordingly, the incomplete execution of the set number of maximum partial lift injections during the period suitable for the fuel injection can be inhibited.

A method in which the details of the processing relating to the setting of the number of executions and the calculation of the injection amount Qpfi are changed in accordance with the number of injections that can be executed can be adopted as an example of specific methods for setting the number of executions of the maximum partial lift injection and calculating the injection amount Qpfi of the port injector 20 in Step S210 and Step S220.

For example, the number of executions of the maximum partial lift injection is set and the injection amount Qpfi of the port injector 20 is calculated by executing the series of processing described with reference to FIG. 4 in a case where the injection can be executed three times. The number of executions of the maximum partial lift injection is set and the injection amount Qpfi of the port injector 20 is calculated by executing the series of processing described with reference to FIG. 6 in a case where the injection can be executed twice.

When the configuration described above is adopted, the maximum number of injections within a range of the number of possible executions among the numbers of injections at which the injection amount Qdi of the maximum partial lift injection per injection stroke becomes equal to or less than the total injection amount can be set as the number of executions.

Accordingly, the maximum partial lift injection can be executed to the maximum extent possible within a range of the number of the possible executions calculated based on the engine rotation speed with the injection amount not exceeding the target amount. Accordingly, the fuel injection control can be performed with the high-accuracy maximum partial lift injection utilized to the maximum extent possible while the incomplete execution of the set number of maximum partial lift injections during the period suitable for the fuel injection can be inhibited.

Apart from this method, it is also possible to set an upper limit value on the number of executions based on the number of injections that can be executed and limit the number of executions of the maximum partial lift injection with the upper limit value. In other words, the number of executions is updated to the value equal to the upper limit value in a case where the number of executions that is selected within a range of the number of injections in which the injection amount Qdi of the maximum partial lift injection per injection stroke becomes equal to or less than the total injection amount exceeds the upper limit value. Then, the injection amount Qpfi of the port injector 20 is calculated based on the number of executions updated to the value equal to the upper limit value and the fuel injection control is executed based on the updated number of executions and the injection amount Qpfi. Even in this case, a configuration in which the number of executions of the maximum partial lift injection is set within a range of the number of injections that can be executed which is calculated based on the engine rotation speed can be realized.

An example in which the maximum number of injections within a range of the number of possible executions among the numbers of injections at which the injection amount Qdi of the maximum partial lift injection becomes equal to or less than the total injection amount is set as the number of executions has been described above. However, the maximum number among the numbers of injections that can be executed does not necessarily have to be equal to the number of executions.

For example, the number of executions may be limited up to twice when the number of injections that can be executed is three times. However, it is desirable to apply the configuration in which the maximum number among the numbers of injections that can be executed among the number of injections satisfying a condition is set as the number of executions as described above in maximizing the number of executions of the high-accuracy maximum partial lift injection, utilizing the high-accuracy maximum partial lift injection to the maximum extent possible, and realizing the precise fuel injection control.

When a configuration in which the number of executions of the maximum partial lift injection by the in-cylinder injector 30 is decreased when the engine rotation speed is high rather than when the engine rotation speed is low is adopted, the incomplete execution of the set number of executions of the maximum partial lift injection during the period suitable for the fuel injection can be inhibited.

In other words, the incomplete execution of the set number of executions of the maximum partial lift injection during the period suitable for the fuel injection can be inhibited even when the processing for calculating the number of injections that can be executed which is based on the engine rotation speed is not executed.

For example, a configuration in which the number of executions of the maximum partial lift injection is set within a range of zero to twice by executing the series of processing described with reference to FIG. 6 when the engine rotation speed is not exceeded by a threshold and the number of executions of the maximum partial lift injection is set within a range of zero to three times by executing the series of processing described with reference to FIG. 4 when the engine rotation speed is exceeded by the threshold can also be adopted. In this case, the incomplete execution of the set number of executions of the maximum partial lift injection during the period suitable for the fuel injection can be inhibited when the magnitude of the threshold is set for the number of executions to be set through the series of processing described with reference to FIG. 4 within the range of the engine rotation speed in which the number of injections that can be executed is at least three times.

What is claimed is:

1. A fuel injection system for an internal combustion engine, the internal combustion engine including:
    a port injector that injects fuel into an intake port; and
    an in-cylinder injector that injects fuel into a cylinder, the in-cylinder injector including a needle valve, and the in-cylinder injector being able to execute partial lift injection while the needle valve is not fully opened,
    the fuel injection system comprising
    an electronic control unit configured to
    control the port injector and the in-cylinder injector by controlling energization of the port injector and the in-cylinder injector,
    calculate a first fuel pressure required in one fuel injection cycle during which a maximum partial lift injection is executed once,
    calculate a second fuel pressure required in one fuel injection cycle during which the maximum partial lift injection is executed twice, the second calculated fuel pressure being less than the first calculated fuel pressure,
    compare a pressure of the fuel supplied to the in-cylinder injector to the first calculated fuel pressure and to the second calculated fuel pressure in order to determine that an injection amount of the maximum partial lift injection in one fuel injection cycle is equal to or less than a target injection amount for one injection cycle,
    set the number of times that the maximum partial lift injection is executed in one fuel injection cycle to zero when the pressure of the fuel supplied to the in-cylinder injector is greater than the first calculated fuel pressure,
    set the number of times that the maximum partial lift injection is executed in one fuel injection cycle to one when the pressure of the fuel supplied to the in-cylinder injector is less than the first calculated fuel pressure and greater than the second calculated fuel pressure,
    set the number of times that the maximum partial lift injection is executed in one fuel injection cycle to two when the pressure of the fuel supplied to the in-cylinder injector is less than the second calculated fuel pressure, cause the in-cylinder injector to execute the maximum partial lift injection the set number of times, and calculate a shortfall of fuel with respect to the target injection amount and cause the port injector to inject the fuel in an amount equal to the calculated shortfall.

2. The fuel injection system according to claim 1, wherein the electronic control unit is configured to cause the port injector to inject fuel in the target injection amount when an amount of fuel injected through one execution of the maximum partial lift injection exceeds the target injection amount.

3. The fuel injection system according to claim 1, wherein the in-cylinder injector includes only one needle valve.

4. The fuel injection system according to claim 1, wherein the electronic control unit is further configured to calculate a third fuel pressure required in one fuel injection cycle during which the maximum partial lift injection is executed three times, the third calculated fuel pressure being less than the second calculated fuel pressure, compare the pressure of the fuel supplied to the in-cylinder injector to the third calculated fuel pressure in order to determine that the injection amount of the maximum partial lift injection in one fuel injection cycle is equal to or less than the target injection amount for one injection cycle, and set the number of times that the maximum partial lift injection is executed in one fuel injection cycle to three when the pressure of the fuel supplied to the in-cylinder injector is less than the third calculated fuel pressure.

5. A fuel injection system for an internal combustion engine, the internal combustion engine including:

a port injector that injects fuel into an intake port; and an in-cylinder injector that injects fuel into a cylinder, the in-cylinder injector including a needle valve, and the in-cylinder injector being able to execute partial lift injection while the needle valve is not fully opened, the fuel injection system comprising at least one electronic control unit configured to control the port injector and the in-cylinder injector by controlling energization of the port injector and the in-cylinder injector, calculate a plurality of number of times that a maximum partial lift injection is executable in one fuel injection cycle based on an engine rotational speed, a length of energizing time for a single maximum partial lift injection, and a length of an interval which is required between respective maximum partial lift injections, set the number of times that the maximum partial lift injection is executed in one fuel injection cycle, to one of the calculated numbers of times, cause the in-cylinder injector to execute the maximum partial lift injection the set number of times, and calculate a shortfall of fuel with respect to the target injection amount and cause the port injector to inject the fuel in an amount equal to the calculated shortfall.

6. The fuel injection system according to claim 5, wherein the electronic control unit is configured to set the number of times that the maximum partial lift injection is executed in one fuel injection cycle, to the largest number of times from among the calculated numbers of times.

* * * * *